(12) United States Patent
Karbasi et al.

(10) Patent No.: US 8,217,125 B2
(45) Date of Patent: Jul. 10, 2012

(54) PROCESS TO REDUCE POLYOLEFINS WITH EXTRA LOW IMPURITY CONTENT

(75) Inventors: Amir Kiumars Karbasi, Espoo (FI); Esa Korhonen, Porvoo (FI); Michiel Bergstra, Antwerpen (BE)

(73) Assignee: Borealis Technology Oy, Porvoo (FI)

( * ) Notice: Subject to any disclaimer, the term of this patent is extended or adjusted under 35 U.S.C. 154(b) by 387 days.

(21) Appl. No.: 12/301,927

(22) PCT Filed: May 22, 2007

(86) PCT No.: PCT/EP2007/004530
§ 371 (c)(1),
(2), (4) Date: Jan. 9, 2009

(87) PCT Pub. No.: WO2007/134837
PCT Pub. Date: Nov. 29, 2007

(65) Prior Publication Data
US 2010/0234541 A1    Sep. 16, 2010

(30) Foreign Application Priority Data

May 22, 2006    (EP) .................................... 06010480

(51) Int. Cl.
*C08F 6/24*    (2006.01)
*C08F 2/12*    (2006.01)
*C08F 10/06*    (2006.01)

(52) U.S. Cl. ............... 526/68; 526/64; 526/70; 528/501

(58) Field of Classification Search .................. 526/68, 526/70, 64; 528/501
See application file for complete search history.

(56) References Cited

U.S. PATENT DOCUMENTS

| | | | | |
|---|---|---|---|---|
| 5,597,892 A * | 1/1997 | Hanson | ......................... | 528/501 |
| 6,566,460 B1 * | 5/2003 | Salmon | .......................... | 526/64 |
| 6,586,537 B2 * | 7/2003 | Marissal et al. | ................. | 526/70 |
| 7,446,167 B2 * | 11/2008 | Blackmon et al. | ............ | 528/495 |
| 7,632,899 B2 * | 12/2009 | Lee et al. | ........................ | 526/64 |

FOREIGN PATENT DOCUMENTS

| | | |
|---|---|---|
| EP | 0069593 A | 1/1983 |
| EP | 0184935 A | 6/1986 |
| EP | 1591459 A | 11/2005 |
| WO | 0234795 A | 5/2002 |
| WO | 2004007566 A | 1/2004 |
| WO | 2006009951 A | 1/2006 |

* cited by examiner

*Primary Examiner* — Fred M Teskin (74) *Attorney, Agent, or Firm* — Panitch Schwarze Belisario & Nadel LLP

(57) ABSTRACT

A process for producing polyolefins, which includes polymerizing at least one olefin monomer, separating at least a part of the reaction mixture, dividing the separated reaction mixture into a polymer-lean fraction and a polymer-rich fraction, and subjecting at least a part of the polymer-lean fraction to a purification step prior to recycling back to the polymerization of at least one olefin monomer. The obtained polyolefins particularly have a low content of volatile low molecular weight compounds, a low content of low-molecular weight polyolefin waxes and a low content of residues derived from the catalyst employed.

16 Claims, 1 Drawing Sheet

Figure 1

PROCESS TO REDUCE POLYOLEFINS WITH EXTRA LOW IMPURITY CONTENT

CROSS-REFERENCE TO RELATED APPLICATIONS

This application is a Section 371 of International Patent Application No. PCT/EP2007/004530, filed May 22, 2007, which was published in the English language on Nov. 29, 2007, under International Patent Publication No. WO 2007/134837 A1 and the disclosure of which is incorporated herein by reference.

BACKGROUND OF THE INVENTION

The present invention relates to a process for producing polyolefins which have a very low content of impurities. The obtained polyolefins particularly have a low content of volatile low molecular weight compounds, a low content of low molecular weight polyolefin waxes, and a low content of residues derived from the catalyst employed in the polymerization.

Generally, polyolefins contain impurities as a result of the polymerization process. Typical impurities include residues from the catalyst employed during the polymerization, including the cocatalyst(s) and scavenger(s), oligomers, by-products and various volatile low molecular weight compounds. Depending on the application, the impurities may have a negative effect even if they are contained in the polymer only in low concentrations. For example, polymers used for water pipes should not contain low molecular weight volatile compounds since these compounds might migrate from the polymer into the transported water and cause taste or odor problems. Further, polymers used for making films to be used in electric devices, such as insulation films in capacitors, should not contain metal impurities in order to avoid an electrical breakthrough through the film. Finally, polymers used in automotive applications, in particular polypropylene used for the manufacture interior parts of an automobile, need to satisfy high standards with respect to volatile compounds contained in the polymer. High amounts of hydrocarbons contained in a polymer employed for preparing such interior parts may lead to fogging problems, in particular when such hydrocarbons, typically hydrocarbons having from 16 to 32 carbon atoms, evaporate from the interior parts and condense on the car windows. At the same time, the appearance of the interior parts is deteriorated.

The recent process developments focus on improved process economy, including increased recycling of raw materials and simple process steps to separate undesired hydrocarbons components from the polymer.

It has been proposed to recover the polymer from the reactor by use of a separating device, such as a hydrocyclone. The hydrocyclone separates a part of the fluid phase from the obtained polymer, thereby producing a concentrated slurry. The separated fluid phase is directly recycled back into the polymerization reactor. While this is advantageous in terms of process economy, disadvantageously, any impurities contained in the fluid are also recycled back to the polymerization zone. This results in an accumulation of these impurities in the reaction mixture over time, and thereby the amount of impurities contained in the obtained polymer will increase. In turn, additional purification steps of the polymer become necessary, which is counterproductive for the overall process economy.

A simple method to remove unwanted hydrocarbons from the obtained solid polymer is to evaporate them. This is usually achieved by reducing the pressure so that at least part of the hydrocarbons is evaporated. Additionally, the temperature may be increased at the same time to facilitate the evaporation. However, any less volatile impurities eventually present in the polymerization mixture cannot be separated from the solid polymer therewith and remain in the product.

EP-A-1591459 relates to a process for producing olefin polymers, wherein the polymer slurry from a loop reactor is directed to a hydrocyclone, which divides the slurry flow into two streams. The overflow, which is rich in liquid, is directly recycled to the loop reactor without purification. The polymer, contained in the underflow, is further treated so as to obtain the final product.

EP-A-1118625 relates to a process for producing olefin polymers using two polymerization reactors connected in series. The reaction mixture, containing the polymer from the first reactor, is separated in a hydrocyclone, and the overflow recycled into the first reactor. The underflow, containing the polymer, is further reacted in the second reactor, followed by the separation in a second hydrocyclone. The overflow of the second hydrocyclone is recycled into the first reactor, while the final product is obtained from the underflow.

EP-A-1118626 discloses a process for producing olefin polymers using two reactors connected in series. The reaction mixture of the first reactor is separated in a first hydrocyclone, and the overflow recycled into the first reactor. The underflow, containing the polymer, is further reacted in a second reactor. The reaction mixture of the second reactor is then separated in a second hydrocyclone. The overflow is distilled and one fraction is recycled into the first reaction, while a second fraction is recycled in the second reactor. The final product is obtained from the underflow.

International Patent Application Publication No. WO 2004/007566 discloses a process for passing a polymerization effluent to a high pressure flash where most of the fluid components are flashed and wherein a slip stream comprising diluent and minor amounts of monomer is separated from the bulk of the flashed fluid components. The process of this application aims at minimizing compression and cooling of product fluids prior to recycling, enabling the recovery and the recycling of monomer free diluent which may be used for the preparation of catalyst mud. Furthermore, the flashing step employed in accordance with the teaching of International Patent Application Publication No. WO 2004/007566 as well as the corresponding process step disclosed in EP-A-1591459 only aims at removing diluent and (optionally) monomer, while leaving all other components, including catalyst residues and impurities in the polymer stream.

However, the processes of the prior art are disadvantageous since impurities contained in the overflow are transferred back into the reactor and accumulate in the reaction mixture and finally in the obtained product. Further, while the distillation of the complete overflow has the result of reducing the impurities to a minimum, improved process economy could be obtained if only a suitable fraction of the overhead were passed through distillation steps.

International Patent Application Publication No. WO 02/34795 discloses a solution polymerization process. Likewise, International Patent Application Publication No. WO 2006/009951 and EP 0184935 relate to solution polymerization processes. Solution polymerization processes are a specific kind of polymerization processes with particular aspects concerning process control and regulation, not comparable with slurry processes as discussed in the above-given prior art documents.

EP 184935 furthermore is concerned with a process for recovering polymer from a solution of the polymer in a solvent, without providing any guidance concerning process control regarding the reduction of impurity contents.

In view of the problems of the processes of the prior art, it is the object of the present invention to provide an improved process for the production of polyolefins having an extra low impurity content while still maintaining a good production economy.

BRIEF SUMMARY OF THE INVENTION

The above object is achieved by a process for producing polyolefins, comprising the steps of:
  polymerizing at least one olefin monomer;
  separating at least a part of the reaction mixture;
  dividing the separated reaction mixture into a polymer-lean fraction and a polymer-rich fraction;
  wherein at least part of the polymer-lean fraction is subjected to a purification step prior to being recycled back to the polymerization of the at least one olefin monomer.

The above object is also achieved by a process for producing polyolefins, comprising the steps of:
  polymerizing at least one olefin monomer;
  separating at least a part of the reaction mixture;
  dividing the separated reaction mixture into a polymer-lean fraction and a polymer-rich fraction;
  dividing the polymer-lean fraction into a first and a second stream;
  recycling the first stream to the polymerization of the olefin monomer;
  purifying the second stream;
  recycling at least a part of the purified second stream back to the polymerization of the olefin monomer.

The above object is furthermore also achieved by a process for producing polyolefins, comprising the steps of:
  polymerizing at least one olefin monomer;
  separating at least part of the reaction mixture;
  dividing the separated reaction mixture into a polymer-lean fraction and a polymer-rich fraction;
  purifying at least a part of the polymer-lean fraction to remove impurities contained in the fraction;
  recycling at least part of the purified polymer-lean fraction to the polymerization of the at least one olefin monomer;
  wherein the step of polymerizing the at least one olefin monomer is carried out in a reaction mixture at least 50% by mole of hydrocarbons having from 1 to 4 carbon atoms.

BRIEF DESCRIPTION OF THE SEVERAL VIEWS OF THE DRAWINGS

The foregoing summary, as well as the following detailed description of the invention, will be better understood when read in conjunction with the appended drawing. For the purpose of illustrating the invention, there is shown in the drawing an embodiment which is presently preferred. It should be understood, however, that the invention is not limited to the precise arrangements and instrumentalities shown.

In the drawing.

DETAILED DESCRIPTION OF THE INVENTION

As outlined above, the present invention provides in particular the processes for producing polyolefins. The embodiments as described in the present specification apply to all processes as illustrated herein. The present invention in particular achieves the advantages, which are illustrated in the examples below, by subjecting at least a part of the polymer-lean fraction, as obtained, to a purification step, prior to the recycling back to the olefin polymerization zone.

A preferred process for producing polyolefins according to the present invention comprises the steps of:
  polymerizing at least one olefin monomer;
  separating at least a part of the reaction mixture;
  dividing the separated reaction mixture into a polymer-lean fraction and a polymer-rich fraction;
  dividing the polymer-lean fraction into a first and a second stream (5, 6);
  recycling the first stream to the polymerization of the olefin monomer;
  purifying the second stream;
  recycling at least a part of the purified second stream back to the polymerization of the olefin monomer.

A further preferred process for producing polyolefins according to the present invention comprises the steps of:
  polymerizing at least one olefin monomer;
  separating at least part of the reaction mixture;
  dividing the separated reaction mixture into a polymer-lean fraction and a polymer-rich fraction;
  purifying at least a part of the polymer-lean fraction to remove impurities contained in the fraction;
  recycling at least part of the purified polymer-lean fraction to the polymerization of the at least one olefin monomer;
  wherein the step of polymerizing the at least one olefin monomer is carried out in a reaction mixture comprising at least 50% by mole of hydrocarbons having from 1 to 4 carbon atoms.

The polymerization as described herein typically is a slurry polymerization, so that the reaction mixture as described herein typically and preferably is a slurry.

After polymerizing at least one olefin monomer in the polymerization zone, at least a part of the reaction mixture, comprising the polyolefin, is separated. The amount separated depends on the size of the polymerization zone and the polymerization reaction. Typically, in continuous processes, the amount of slurry removed from the reaction mixture is selected so that the amount of polymer contained in the separated reaction mixture equals the amount of polymer produced in the reactor. If, for example, the polymer production rate is 8 tons/hour, an amount of 8 tons of polymer per hour can be separated from the reaction mixture in a continuous process. In typical processes in accordance with the present invention, the reaction mixture, in particular in the form of a slurry, typically contains from 10 to 40% by volume of polymer, and in embodiments up to 50% by weight. Accordingly, with commercial scale polymerization zones, i.e. reactors, about 1 to 20 tons of polymers are produced per hour so that corresponding amounts can be withdrawn, i.e. separated. Smaller polymerization zones and reactors provide smaller rates of withdrawn material. The part of the reaction mixture, which comprises polyolefin product, may be withdrawn from the polymerization zone continuously or intermittently. In a preferred embodiment, concentrating devices, such as settling legs, may be used to concentrate the reaction mixture, preferably in form of a slurry, to be withdrawn from the reactor.

As already indicated above, the reaction mixture as withdrawn from the polymerization zone, typically a slurry, comprises from 10 to 40% by volume of polymer. If concentrated, using for example a settling leg, the concentrated slurry may have a polymer content of from 30 to 55% by volume. In another preferred embodiment, the reaction mixture is withdrawn continuously in such a manner that the concentration of the withdrawn reaction mixture is the same as the concentration of the reaction mixture contained within the polymerization zone.

The separated part of the reaction mixture is divided into a polymer-lean fraction and a polymer-rich fraction. A typical ratio of polymer-lean fraction to polymer-rich fraction is from about 0.01:10, preferably from 0.01:5, and more preferably from 0.1:2. The polymer-rich fraction comprises at least 70 wt % of the polymer of the separated part of the reaction mixture, preferably more than 80 wt % and more preferably more than 90 wt %.

Any suitable device or a combination of devices may be used. Preferred are a hydrocyclone and a screen, such as a self-cleaning screen or a centrifuge, with hydrocyclones and screens being preferred. If a hydrocyclone is used, the polymer-lean stream is withdrawn from the top of the hydrocyclone, while the dense, polymer-rich fraction is withdrawn from the bottom of the hydrocyclone.

The polymer-rich fraction may then be directed to other conventional processing steps, such as subsequent flashing steps and/or drying steps. The finally obtained polymer may also be directed to an additional polymerization, for example a gas phase polymerization.

The polymer-lean fraction as described herein in accordance with the preceding disclosure is liquid or in the super critical state, such as a liquid polymer-lean fraction obtained from a reaction mixture of a slurry polymerization. In accordance with the present invention, the polymer-lean fraction as described herein typically contains at least one of the impurities discussed above, such as oligomers, catalyst residues etc., i.e., components which cannot be removed from the polymer by simple flashing operations.

The above description defines that the polymer-lean fraction is separated from the reaction mixture, yielding also the polymer-rich fraction by a process and using suitable devices yielding such liquid or super critical polymer-lean phases, such as the devices mentioned above, namely a hydrocyclone, a screen, a centrifuge, etc. Such a process of dividing a reaction mixture into a polymer-lean fraction and a polymer-rich fraction is different from a flash evaporation or flash treatment, wherein a part of a reaction mixture is transformed into a gaseous phase (prior to re-condensing this gaseous phase as required). In accordance with the present invention, the division into the two phases itself is carried out in the liquid or super critical state.

The polymer-lean fraction comprises impurities. In accordance with the present invention, impurities are, in particular, compounds being selected from at least one of olefin oligomers, metal components, and byproducts formed during the polymerization. Examples of the byproducts include ketones, aldehydes, sulphur-containing compounds, and alcohols. Other impurities which may be contained therein are impurities already contained in the monomer, comonomer or additives introduced into the polymerization zone. The polymer-lean fraction further comprises unreacted monomer, comonomer and, optionally, diluent.

Disadvantageously, recycled byproducts comprising oxygen atoms or sulphur atoms, such as ketones or aldehydes, may react with the catalyst in the reaction mixture, thereby possibly deactivating the catalyst and thus reducing the process efficiency. Further, catalyst material is expensive and itself a source of impurities. Accordingly, the concentration of catalyst should be kept as low as possible. Furthermore, especially sulphur-containing impurities may result in an odor problem if they accumulate in the polymerization zone and consequently in the obtained polymer.

Recycled oligomers are considered impurities since their presence in the final polyolefin often affects the properties of the polymer. Thus, an accumulation of oligomers in the polymerization zone and in turn in the polymer should be avoided since otherwise an additional purification step of the polymer would become necessary. Oligomers in particular are detrimental with respect to the criteria of extractables (i.e., components that may be extracted from the polymer by using a suitable extracting agent, such as hexane). Higher levels of extractables are, as already indicated above, detrimental in fields of uses where evaporation of low molecular weight components is considered as being detrimental (for example, in automobiles) while further disadvantages are, for example, the prevention of obtaining an FDA approval for a given polymer needed, for example, for medical applications. Typically, the presence of oligomers in end products causes further taste and odor problems and, in addition, a high oligomer content also may cause excessive smoke formation during extrusion, a clear disadvantage for the further processing of polymer products comprising high amounts of oligomers.

The separation of the impurities from the components to be recycled into the polymerization zone thus contributes to the improved lifetime of the catalyst and the overall quality of the polyolefin product.

The embodiment as described above, which is characterized in that the polymerization reaction is carried out in a reaction mixture comprising at least 50% by mole of hydrocarbons having from 1 to 4 carbon atoms, requires that at least a part of the polymer-lean fraction obtained after withdrawing at least a part of the reaction mixture from the polymerization reaction be subjected to a purification. In this embodiment, it is further preferred that the polymerization be carried out in a reaction mixture comprising at least 80% by mole of hydrocarbons having from 1 to 4 carbon atoms. The hydrocarbons having from 1 to 4 carbon toms may be selected from monomers, comonomers and diluents.

In this embodiment, it is furthermore envisaged that at least a part of the purified polymer-lean fraction is subjected to any of the purification steps as illustrated herein, which also comprises the possibility of subjecting the entire polymer-lean fraction to a purification step. Suitable purifications are discussed further below. However, these embodiments likewise apply to the present embodiment of the present invention, i.e., the embodiment characterized in using the reaction mixture comprising at least 50% by mole of hydrocarbons having from 1 to 4 carbon atoms during polymerization.

Further preferred embodiments of this process can be derived from the following description which focuses, however, on the embodiment of the present invention comprising the division of the polymer-lean fraction into a first and a second stream. The embodiment is described in more detail in the following.

The polymer-lean fraction is divided into a first and a second stream. The step is also preferably carried out in a hydrocyclone or a screen, but any suitable device or combination of devices can be used. Preferably, from 10 to 95 wt % of the polymer-lean fraction is divided into the second stream, more preferably from 20 to 80 wt %, and even more preferably from 30 to 70 wt %. For economical reasons, it is sufficient when about 40 to 90% of the polymer-lean fraction is divided into the second stream, which then subsequently is subjected to further treatments, as further outlined below.

The first stream, being from 5 to 90 wt % of the polymer-lean fraction, preferably from 20 to 80 w %, more preferably from 30 to 70 wt %, is recycled back into the polymerization zone without purification. The second stream is purified prior to recycling at least a part of the purified stream back to the polymerization mixture. Preferably, from 50 to 99 wt % is recycled, more preferably from 60 to 95 wt %, and more preferably from 70 to 90 wt %.

As outlined above, the second stream is subjected to a suitable purification treatment, which may be a single purification step or a combination of purification steps. Typical and suitable examples of purification steps are purifications in flashing devices, purifications by distillation and also purification by extractions and combination thereof. Preferred, in accordance with the present invention, mainly for economical reasons, are flashing steps and distillation steps.

Impurities which may be removed by flashing are in particular oligomers and catalyst residues. Typically, compounds that are lighter than $C_5$ hydrocarbons leave the flash stage as vapor, while heavier components may be removed as liquid. Accordingly, flashing steps are, in particular, suitable to remove substantial fractions of impurities, in particular the heavier components identified above.

As outlined above, a further possibility of carrying out a purification of the second stream is a distillation step. Practically, all impurities may be removed in a distillation using a so-called heavies column. Typically, the top fraction of such a heavies column contains the product stream to be recycled into the polymerization, including unreacted monomers, diluents etc., whereas the bottom stream contains the oligomers, the catalyst components and eventual hydrolysis products thereof (i.e., products which typically have higher molecular weight than the initial compounds of the reaction mixture). The top stream from the heavies column may be subjected to a further distillation step using a so-called light column, resulting in a top stream rich in light components, such as propane, as well as ethylene and hydrogen. This additional purification step, however, does not have a great effect on the polymer properties.

The purification of the second stream of the polymer-lean fraction is preferably carried out by conducting at least one flashing step. The thus separated fraction, which comprises unreacted monomer and, if employed, diluent, is recycled back into the reaction mixture.

Additional fractions comprising oxygen-containing compounds and/or sulphur-containing compounds are either further purified or disposed. The fraction, which comprises oligomers and catalyst residues, is also either further purified or disposed.

Also preferred is the second stream being purified by conducting at least one distillation step. The distilled fraction(s) which comprise(s) unreacted monomer and, if employed, diluent, is recycled back into the reaction mixture, while the fractions which comprise separated oligomers and catalyst residues are further purified or disposed.

The purification step can comprise more than one flashing step and/or more than one distillation step in any suitable order and combination.

Due to the separation of impurities prior to recycling the stream back into the polymerization mixture, the impurities do not accumulate in the polymerization zone and in turn in the polymer product. Advantageously, the activity of the employed active catalyst and the quality of the product are improved thereby.

Figure 1:
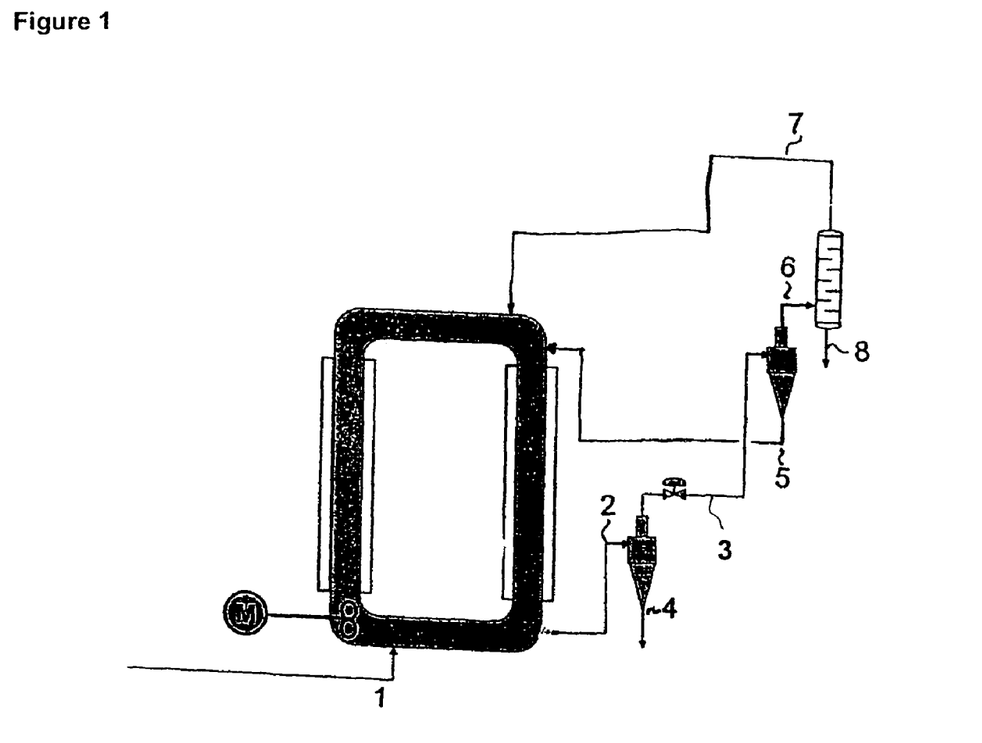
FIG. 1 is a flow diagram of a process in accordance with the present invention.

FIG. 1 illustrates a process in accordance with the present invention. Components, such as fresh monomer and catalyst, are fed into the reactor, in this case a loop reactor, via feed 1. At least a part of the reaction mixture may be separated via line 2 and directed to a hydrocyclone to divide the separated reaction mixture into a polymer-lean fraction and a polymer-rich fraction. The polymer-lean fraction is directed via line 3 into a second hydrocyclone. The polymer-rich fraction is withdrawn from the bottom of the hydrocyclone via line 4 to withdraw the product, which may, however, as described herein be subjected to further processing steps, such as admixing with fresh monomer, polymerization, compounding, etc.

The first stream withdrawn from the bottom of the second hydrocyclone is recycled into the reaction mixture without further purification via line 5. The second stream, withdrawn from the top of the hydrocyclone via line 6, is purified by distillation. The fraction(s) comprising unreacted monomer (and optional comonomer) and optionally diluent is recycled back into the reactor via line 7, while fractions comprising the above-mentioned impurities are withdrawn via line 8 and may be further purified or disposed.

In a preferred embodiment of the process of the present invention, the polymer-rich fraction is, after separation, in an additional step, mixed with fresh olefin monomer or fresh diluent, followed by dividing the mixture into a second polymer-rich fraction and a monomer-rich fraction. The ratio of second polymer-rich fraction to monomer-rich fraction as obtained in this preferred embodiment of the present invention may vary over a broad range depending on the type of polymerization reaction, etc. However, ratios of from 70:30 to 30:70 are envisaged by the present invention. The additional step of dividing the polymer-rich fraction may be carried out in any suitable device or combination of devices as mentioned above. Preferably, a hydrocyclone or a screen is used. The monomer-rich fraction is further preferably recycled to the polymerization of the olefin monomer.

According to an even more preferred embodiment of the invention, a part of the reaction mixture is withdrawn from the polymerization zone and directed to a first screen or hydrocyclone.

The polymer-lean fraction withdrawn from the first screen or hydrocyclone is directed to a second screen or hydrocyclone. The dense first stream withdrawn therefrom is preferably mixed with a monomer-rich fraction withdrawn from the third screen or hydrocyclone as explained below and recycled into to the polymerization zone, but may of course be recycled separately. The lean second stream withdrawn from the second screen or hydrocyclone is directed to subsequent purification as described above, preferably at least one distillation step. The purified stream is recycled back to the polymerization, while the separated impurities are either further purified or disposed.

The polymer-rich fraction withdrawn from the first screen or hydrocyclone is mixed with a stream of fresh diluent or fresh liquid monomer. This mixed stream is then directed to a third screen or hydrocyclone.

The polymer-lean fraction withdrawn from the third screen or hydrocyclone is combined with the first stream of the second screen or hydrocyclone and recycled to the polymerization zone, but may of course be recycled separately. The second polymer-rich fraction withdrawn from the third screen or hydrocyclone may be directed to subsequent conventional process steps, such as further polymerization steps, flashing, drying, catalyst deactivation and extrusion.

In the process of the present invention, the fraction of the contents to be recycled into the polymerization zone determines the fraction of fresh contents to be directed into the polymerization zone. More specifically, (1) the total liquid feed into the reactor, (2) the purity requirement of the polymer, and (3) the production economy have to be taken into account when determining the fraction of fluid to be recycled.

If one screen or hydrocyclone is used, the ratio of the first and second stream of the polymer-lean fraction to be recycled may be selected in view of the balance of the desired purity against the production economy. Where two or more screens or hydrocyclones are used, the total liquid feed into the reactor needs to be considered. It is advantageous to select the fresh liquid stream into the second screen hydrocyclone so that the monomer-rich fraction from the second screen hydrocyclone, and the first stream recycled into the polymerization zone without purification, is from 50 to 95% by weight, preferably from 60 to 90%, and more preferably from 70 to 80% of the total fresh liquid feed into the polymerization zone of the total liquid feed.

With the process of the present invention as described above, polyolefins are obtained. Generally, any suitable polymerization process for obtaining polyolefins may be employed. In the following, the polymerization reaction of the olefin monomers will be described in more detail.

Any suitable olefin monomers may be used. Preferred are, however, alpha-olefins having from 2 to 12 carbon atoms. More preferred are monomers selected from the group of ethylene, propylene, 1-butene, 1-hexene and 4-methyl-1-pentene.

The polymerization may also be carried out in the presence of at least one comonomer. The same compounds that can be used as monomers may also be used as comonomers. In addition, polyenes, such as dienes or trienes, and cyclic olefins, such as styrene or norbornene, may be used. The polymerization may be carried out in the presence of one comonomer or a mixture of two or more comonomers. The comonomer(s) may be used to control the density and/or the crystallinity of the polymer.

The polymerization may be carried out in the presence of a catalyst. The catalyst may be any catalyst known in the art which is suitable for olefin polymerization. Preferably, the catalyst is a transition metal catalyst. More preferred is the transition metal catalyst being a particulate solid wherein the particles have an average particle size of from 1 to 1000 µm.

Examples of suitable catalysts for the present invention include transition metal catalysts containing a magnesium compound and a titanium compound supported on an inorganic oxide carrier, as disclosed in, for example, EP 688794, and in International Patent Application Publication Nos. WO 91/16361, WO 93/13141, WO 94/14857, WO 99/51646 and WO 01/55230. However, the catalyst may also contain a titanium compound supported on magnesium halide, as disclosed in International Patent Application Publication Nos. WO 03/000756, WO 03/000757, WO 03/000754, WO 92/19653, WO 93/07182, WO 97/36939 and WO 99/58584. The catalyst may further be unsupported, comprising particles of solid titanium trichloride, optionally containing additional components, such as aluminum trichloride.

The catalyst may further be a chromium catalyst, which is typically supported on silica. Such catalysts are disclosed, among others, in International Patent Application Publication Nos. WO 99/52951 and WO 97/27225. The catalyst may also be a metallocene catalyst. Often the catalysts are supported, preferably on an inorganic oxide carrier, as disclosed in International Patent Application Publication Nos. WO 95/12622, WO 96/32423, WO 98/32776 and WO 00/22011. Such supported metallocene catalysts may further contain an activator, such as an alumoxane, supported on the same catalyst particles. However, the catalyst may alternatively be prepared by forming the support from alumoxane and incorporating the metallocene compound on the alumoxane. Such a method of preparing solid metallocene catalyst components is disclosed in International Patent Application Publication No. WO 03/051934.

The solid catalyst component may furthermore comprise a polymer. Thus, a prepolymerized minor amount of polymer may be contained on the solid catalyst component, for instance of from 0.01 to 50 g of polymer per g of the solid catalyst component. The monomer used for the prepolymerization may be the same as described above, or may be different therefrom.

The activator may be any suitable activator known in the art. Preferably, the activator is dissolved in the reaction medium. Examples of suitable activators include organometal compounds, such as the organoaluminum compounds, e.g., aluminum alkyls. Preferred activators are trimethylaluminum, triethylaluminum, tri-isobutylaluminum, tri-n-hexylaluminum, tri-n-octylaluminum and isoprenyl aluminum. Other suitable activator compounds include methylalumoxane, tri-isobutylalumoxane, hexa-isobutylalumoxane and other alumoxanes; dimethylaluminum chloride, diethylaluminum chloride, methylaluminum sesquichloride, ethylaluminum sesquichloride, diethyl zinc and triethyl boron.

The activator may be optionally combined with an electron donor. The electron donor may be any compound known in the art which is suitable for controlling the selectivity of the catalyst. Examples thereof include ethers, esters, ketones, alcohols, carboxylic acids, silicon ethers, imides, amides and amines.

The polymerization may be carried out in the presence of additional components if desired. For example, at least one diluent may be used in the polymerization process. Suitable diluents are compounds which dissolve the reactants, e.g., the monomer, optional comonomers and optional additives. The diluent must be inert towards the polymerization catalyst so as to avoid undesired side reactions with the catalyst. Suitable diluents are aliphatic hydrocarbons. Preferred are linear aliphatic hydrocarbons having from 1 to 15 carbon atoms. More preferably, the diluent is a low-boiling hydrocarbon containing from 1 to 6 carbon atoms, such as propane, butane, isobutane, pentane, or hexane. Mixtures of the aforementioned compounds may also be used. In an embodiment of the present invention, the diluent is a $C_1$-$C_4$ hydrocarbon (or a mixture thereof) or the diluent is a mixture comprising at least more than 50%, preferably more than 80% (by mole) of the above-mentioned $C_1$-$C_4$ hydrocarbons.

Hydrogen may be used in the polymerization to control the molecular weight of the polymer. The amount of hydrogen depends on the type of catalyst used, the concentrations of the monomer and comonomers, the polymerization temperature and the desired melt index of the polymer.

In addition, other suitable additives, such as antistatic agents and scavengers, may be introduced into the polymerization zone.

The polymerization reaction may be carried out in any type of suitable reactor. Preferred are a continuous stirred tank reactor and a loop reactor, such as a vertical loop reactor or a horizontal loop reactor The temperature is chosen to be in the range of from 20 to 150° C., preferably of from 50 to 110° C., more preferably from 70 to 100° C. The temperature should be sufficiently high so that a desired polymerization rate is achieved, but should not be set above the temperature at which a significant amount of the polymer dissolves in the reaction mixture.

The pressure within the polymerization zone may range of from 10 to 100 bar, preferably from 30 to 80 bar. If the polymerization is conducted in a liquid slurry, the pressure should be sufficiently high to maintain the reaction mixture in liquid state. If the polymerization is conducted above the critical temperature of the reaction fluid, then the pressure within the reaction zone should preferably exceed the critical pressure of the reaction fluid.

Polymerization may be conducted without a diluent in liquid monomer. If a diluent is present, the monomer concentration may range from 1 to 99% by mole. For the polymerization of ethylene, the concentration is typically from 2 to 50% by mole, and preferably from 3 to 30%. For the polymerization of propylene, the reaction is typically conducted in liquid propylene and the concentration of propylene is typically from 50 to 99.9% by mole, preferably from 60 to 99% by mole and in particular from 70 to 98% by mole.

Generally, the concentration of the polymer in the reaction mixture is from 30 to 60% by weight of the slurry, and preferably from 35 to 55%.

The present invention will now be illustrated by examples, but it is not intended that the invention is limited thereto.

EXAMPLES

Determination Methods

Melt Flow Rate

The melt flow rate was determined according to ISO 1133. The load is indicated as a subscript. For polypropylene, the measurement temperature is 230° C. and for polyethylene, the temperature is 190° C.

Volatile Components

The volatile components (also light components, light compounds; which are mainly hydrocarbons and hydrocarbon derivatives, such as ketones, aldehydes and alcohols, containing from 6 to 20 carbon atoms and especially from 8 to 12 carbon atoms) were determined by using a gas chromatograph and a headspace method. The equipment was a Perkin Elmer gas chromatograph with a 30 m×0.25 mm×0.25 μm column filled with DB-wax (100% polyethylene glycol). A flame ionization detector (FID) was used, with hydrogen as a fuel gas. Helium at 18 psi was used as a carrier gas. After the injection of the sample, the oven temperature was maintained at 50° C. for 3 minutes, after which it was increased at a rate of 12° C./min until it reached 200° C. Then the oven was maintained at that temperature for 4 minutes, after which the analysis was completed.

The calibration was carried out as follows:

From 5 to 10 reference solutions were prepared, containing from 0.1 to 100 g of acetone dissolved in 1 litre of n-butanol. 4 μl of each solution was injected into a 20 ml injection flask, which was thermostated to 120° C. for 60 minutes and analyzed. A calibration line for the area under the acetone peak vs. the concentration of acetone in n-butanol was thus obtained.

The analysis was conducted as follows:

The polymer sample (of 2 grams) was placed in the 20 ml injection flask, which was thermostated to 120° C. for 5 hours. A gas sample from the injection flask was then injected into the GC. Before the analysis, a blind run was conducted, where an injection from an empty flask was made. The hydrocarbon emission E was then calculated as follows:

$$E = (A-B)/k \cdot 2 \cdot 0.6204$$

Where E is the hydrocarbon emission as μg carbon per gram of sample,

A is the total area under the sample peaks,
B is the total area under the blind run peaks, and
k is the slope of the calibration line.

Ash Content

The total ash content of the polymer was measured by combusting the polymer in an oven at 750° C. The polymer sample (about 20 grams) was weighed into a platinum fire pot. Then the pot containing the sample was placed into the oven and kept there at 750° C. for 15 minutes. The pot was weighed and the amount of ash in the pot was determined. The ash content was given as the fraction of the residual material from the total polymer amount.

Metal Contents

The content of aluminum and magnesium was determined from the ash. The ash obtained from the combustion as above was dissolved in 5 ml nitric acid under heating so that the ash sample dissolved. The solution was then diluted with distilled water to 100 ml and filtered through a 0.45 μm filter. The metal content was determined from the filtered solution by ICP (Inductively Coupled Plasma).

Reference Example 1

Propylene was polymerized in a 150 dm³ loop reactor in the presence of a catalyst system comprising a solid component as prepared according to Example 3 of EP 591224, a triethylaluminum cocatalyst and dicyclopentyldimethoxysilane as an electron donor. The molar ratios of aluminum in the cocatalyst to titanium in the solid component and aluminum in the cocatalyst to electron donor were 200 and 10, respectively. The reactor was operated at a temperature of 85° C. and a pressure of 54 bar g. In addition, hydrogen was introduced so that its concentration in the propylene feed was 24 mol/kmol propylene. The propylene feed was 140 kg/h, and the catalyst feed rate was such that the polymerization (production) rate was 40 kg/h. The polymer had a melt flow rate $MFR_2$ measured at 230° C. of 130 g/10 min.

The polymer slurry was withdrawn intermittently from the reactor. The polymer slurry was passed into a concentrating step, where a screen was used to separate a part of the fluid phase from the slurry. The polymer content of the entering slurry was 45% by weight and of the dense polymer-rich fraction up to 65% by weight. The polymer-lean fraction contained <0.1% of polymer.

The polymer slurry recovered from the concentrating step was directed to a flash where the hydrocarbons were removed from the polymer. The hydrocarbons recovered from the flash and concentrating steps were flared.

The content of light compounds was determined from the polymer. It was found that it was 130 ppm (parts per million).

Comparative Example 1

The procedure of Reference Example 1 was repeated with the exception that the concentration step was not present in the process. The content of the light compounds determined from the polymer was 270 ppm.

TABLE 1

Date of polymerization and resulting polymers

|  | Example | |
| --- | --- | --- |
|  | R1 | C1 |
| Al/Ti, mol/mol | 200 | 200 |
| Al/Don, mol/mol | 10 | 10 |
| Propylene feed, kg/h | 140 | 140 |
| $H_2$-content, mol/kmol | 24 | 24 |
| Temperature, ° C. | 85 | 85 |
| Production (polymerization) rate, kg/h | 40 | 40 |
| Solid concentration, wt % | 25 | 25 |
| $MFR_2$, g/10 min | 130 | 130 |
| Light components in polymer, ppm | 130 | 270 |

Reference Example 2

Propylene was polymerized in a 150 dm³ loop reactor in the presence of a catalyst system comprising a solid component prepared according to Example 3 of EP 591224, triethylaluminum cocatalyst and dicyclopentyldimethoxy silane as an electron donor. The molar ratios of aluminum in the cocatalyst to titanium in the solid component and aluminum in the cocatalyst to electron donor were 380 and 5, respectively. The reactor was operated at a temperature of 85° C. and a pressure of 55 bar g. In addition, hydrogen was introduced so that its concentration in the propylene feed was 27.5 mol/kmol propylene. The propylene feed was 135 kg/h, and the catalyst feed rate was such that the polymerization (production) rate was 43 kg/h. The polymer had a melt flow rate $MFR_2$ measured at 230° C. of 110 g/10 min.

The polymer slurry was withdrawn intermittently from the reactor. The polymer slurry was passed into a concentrating step, where a screen was used to separate a part of the fluid phase from the slurry. The polymer content of the entering slurry was 46% by weight and of the dense phase up to 65% by weight. The lean phase contained <0.1% of polymer.

The content of light compounds was determined from the polymer. It was found that it was 140 ppm.

Comparative Example 2

The procedure of Reference Example 2 was repeated with the exception that the concentration step was not present in the process. The content of the light compounds determined from the polymer was 230 ppm.

TABLE 2

Data of polymerization and resulting polymers

| | Example | |
|---|---|---|
| | R2 | C2 |
| Al/Ti | 380 | 380 |
| Al/Don | 5 | 5 |
| Propylene feed | 135 | 135 |
| $H_2$-/C3 mol/kmol | 27.5 | 27.5 |
| Production (polymerization) rate | 43 | 43 |
| Solid concentration | 46 | 46 |
| $MFR_2$, g/10 min | 110 | 110 |
| Light components, ppm | 140 | 230 |

Reference Example 3

Propylene was polymerized in a 150 dm³ loop reactor in the presence of a catalyst system comprising a solid component prepared according to Example 3 of EP 591224, triethylaluminum cocatalyst and dicyclopentyldimethoxy silane as an electron donor. The molar ratios of aluminum in the cocatalyst to titanium in the solid component and aluminum in the cocatalyst to electron donor were 420 and 5, respectively. The reactor was operated at a temperature of 85° C. and a pressure of 55 bar g. In addition, hydrogen was introduced so that its concentration in the propylene feed was 27 mol/kmol propylene. The propylene feed was 135 kg/h, and the catalyst feed rate was such that the polymerization (production) rate was 45 kg/h. The polymer had a melt flow rate $MFR_2$ measured at 230° C. of 100 g/10 min.

The polymer slurry was withdrawn intermittently from the reactor. The polymer slurry was passed into a first concentrating step, where a screen was used to separate a part of the fluid phase from the slurry. The polymer content of the entering slurry was 45% by weight and of the dense phase up to 65% by weight. The lean phase contained <0.1% of polymer. The polymer was mixed with a liquid flow of 3 kg propane/kg polymer and passed to a second concentration step operating in the same way as the first concentration step.

The content of light compounds was determined from the polymer. It was found that it was 40 ppm.

Comparative Example 3

The procedure of Reference Example 3 was repeated with the exception that the two concentration steps were not present in the process. The content of the light compounds determined from the polymer was 260 ppm.

TABLE 3

Data of polymerization and resulting polymers

| | Example | |
|---|---|---|
| | R3 | C3 |
| Al/Ti | 420 | 420 |
| Al/Don | 5 | 5 |
| Propylene feed | 135 | 135 |
| $H_2$-/C3 mol/kmol | 27 | 27 |
| Production (polymerization) rate | 45 | 45 |
| Solid concentration | 46 | 46 |
| $MFR_2$, g/10 min | 100 | 100 |
| Kg Propane/kg Polymer | 3.6 | — |
| Light components, ppm | 40 | 260 |

Reference Example 4

Propylene was polymerized in a 150 dm³ loop reactor in the presence of a catalyst system comprising a solid component prepared according to Example 8 of EP 1403292, triethylaluminum cocatalyst and dicyclopentyldimethoxy silane as an electron donor. The molar ratios of aluminum in the cocatalyst to titanium in the solid component and aluminum in the cocatalyst to electron donor were 100 and 5, respectively. The reactor was operated at a temperature of 85° C. and a pressure of 55 bar g. In addition, hydrogen was introduced so that its concentration in the propylene feed was 20 mol/kmol propylene. The propylene feed was 136 kg/h, and the catalyst feed rate was such that the polymerization (production) rate was about 43.6 kg/h. The polymer had a melt flow rate $MFR_2$ measured at 230° C. of 110 g/10 min.

The polymer slurry was withdrawn intermittently from the reactor. The polymer slurry was passed into a first concentrating step, where a screen was used to separate a part of the fluid phase from the slurry. The polymer content of the entering slurry was 45% by weight and of the dense phase up to 65% by weight. The lean phase contained <0.1% of polymer. The polymer was mixed with a liquid flow of 2 kg propane/kg polymer and passed to a second concentration step operating in the same way as the first concentration step.

The content of light compounds was determined from the polymer. It was found that it was 20 ppm.

Comparative Example 4

The procedure of Reference Example 4 was repeated with the exception that the two concentration steps were not present in the process. The content of the light compounds determined from the polymer was 170 ppm.

TABLE 4

Data of polymerization and resulting polymers

| | Example | |
|---|---|---|
| | R4 | C4 |
| Al/Ti | 100 | 100 |
| Al/Don | 5 | 5 |
| Propylene feed | 136 | 136 |
| H$_2$-/C3 mol/kmol | 20 | 20 |
| Production (polymerization) rate | 43.6 | 43.6 |
| Solid concentration | 45 | 45 |
| MFR$_2$, g/10 min | 110 | 110 |
| Kg Propane/kg Polymer | 2 | — |
| Light components, ppm | 20 | 170 |
| Al in polymer, ppm | 21 | 169 |
| Mg in polymer, ppm | 6.8 | 7.6 |
| Ti in polymer, ppm | 1.9 | 2.4 |
| Total ash, ppm | 82 | 454 |

Reference Example 5

Propylene was polymerized in a 150 dm$^3$ loop reactor in the presence of a catalyst system comprising a solid component prepared according to Example 8 of EP1403292, triethylaluminum cocatalyst and dicyclopentyldimethoxy silane as an electron donor. The molar ratios of aluminum in the cocatalyst to titanium in the solid component and aluminum in the cocatalyst to electron donor were 90 and 5, respectively. The reactor was operated at a temperature of 85° C. and a pressure of 55 bar g. In addition, hydrogen was introduced so that its concentration in the propylene feed was 20 mol/kmol propylene. The propylene feed was 135 kg/h, and the catalyst feed rate was such that the polymerization (production) rate was 45 kg/h. The polymer had a melt flow rate MFR$_2$ measured at 230° C. of 110 g/10 min.

The polymer slurry was withdrawn intermittently from the reactor. The polymer slurry was passed into a first concentrating step, where a screen was used to separate a part of the fluid phase from the slurry. The polymer content of the entering slurry was 45% by weight and of the dense phase up to 65% by weight. The lean phase contained <0.1% of polymer. The polymer was mixed with a liquid flow of 0.5 kg propane/kg polymer and passed to a second concentration step operating in the same way as the first concentration step.

The content of light compounds was determined from the polymer. It was found that it was 50 ppm.

Comparative Example 5

The procedure of Reference Example 5 was repeated with the exception that the two concentration steps were not present in the process. The content of the light compounds determined from the polymer was 190 ppm.

TABLE 5

Data of polymerization and resulting polymers

| | Example | |
|---|---|---|
| | R5 | C5 |
| Al/Ti | 90 | 90 |
| Al/Don | 5 | 5 |
| Propylene feed | 135 | 135 |
| H$_2$-/C3 mol/kmol | 20 | 20 |
| C$_2$-feed | — | — |
| Production (polymerization) rate | 45 | 45 |
| Solid concentration | 48 | 48 |
| MFR$_2$, g/10 min | 110 | 110 |
| Kg Propane/kg Polymer | 0.5 | — |
| Light components, ppm | 50 | 190 |

Reference Example 6

Propylene was polymerized in a 150 dm$^3$ loop reactor in the presence of a catalyst system comprising a solid component prepared according to Example 8 of EP1403292, triethylaluminum cocatalyst and dicyclopentyldimethoxy silane as an electron donor. The molar ratios of aluminum in the cocatalyst to titanium in the solid component and aluminum in the cocatalyst to electron donor were 90 and 50, respectively. The reactor was operated at a temperature of 85° C. and a pressure of 55 bar g. In addition, hydrogen was introduced so that its concentration in the propylene feed was 14 mol/kmol propylene. The propylene feed was 135 kg/h, and the catalyst feed rate was such that the polymerization (production) rate was 45 kg/h. The polymer had a melt flow rate MFR$_2$ measured at 230° C. of 130 g/10 min.

The polymer slurry was withdrawn intermittently from the reactor. The polymer slurry was passed into a first concentrating step, where a screen was used to separate a part of the fluid phase from the slurry. The polymer content of the entering slurry was 45% by weight and of the dense phase up to 65% by weight. The lean phase contained <0.1% of polymer. The polymer was mixed with a liquid flow of 5 kg propane/kg polymer and passed to a second concentration step operating in the same way as the first concentration step.

The content of light compounds was determined from the polymer. It was found that it was 30 ppm.

Comparative Example 6

The procedure of Reference Example 6 was repeated with the exception that the two concentration steps were not present in the process. The content of the light compounds determined from the polymer was 290 ppm.

TABLE 6

Data of polymerization and resulting polymers

| | Example | |
|---|---|---|
| | R6 | C6 |
| Al/Ti | 90 | 90 |
| Al/Don | 50 | 50 |
| Propylene feed | 135 | 135 |
| H$_2$-/C3 mol/kmol | 14 | 14 |
| C$_2$-feed | — | — |
| Production (polymerization) rate | 45 | 45 |
| Solid concentration | 9 | 9 |
| MFR$_2$, g/10 min | 130 | 130 |
| kg Propane/kg Polymer | 5 | — |
| Light components, ppm | 30 | 290 |

Reference Example 7

Propylene was polymerized in liquid monomer in a 5 dm$^3$ batch reactor for 30 minutes in the presence of a catalyst system comprising a solid component prepared according to Example 3 of EP 591224, triethylaluminum cocatalyst and dicyclopentyldimethoxy silane as an electron donor. The molar ratios of aluminum in the cocatalyst to titanium in the solid component and aluminum in the cocatalyst to electron donor were 250 and 10, respectively. The reactor was operated at a temperature of 80° C. In addition, 1 mol hydrogen was introduced.

Liquid propylene was withdrawn from the reactor. The polymer content in the slurry was 35% by weight. After removal of liquid propylene, the polymer content in the slurry was 60% by weight. The remaining propylene was flashed.

The dense phase from the concentrating step was introduced into a gas phase reactor, which was operated at a temperature of 85° C. and pressure of 20 bar. Additional propylene, 350 mmol hydrogen and triethylaluminum cocatalyst were introduced into the gas phase reactor. The molar ratio of aluminum in the additional cocatalyst to titanium in the solid component was 125. The polymerization was continued for 60 min. The melt index $MFR_2$ of the polymer mixture was 50 g/10 min.

The content of light compounds was determined from the polymer after the gas phase reactor. It was found that it was 150 ppm.

Comparative Example 7

The procedure of Reference Example 7 was repeated, except that no liquid propylene was removed between the bulk phase and the slurry phase polymerization, all liquid propylene was flashed and no additional cocatalyst was added. The content of the light compounds determined from the polymer after the gas phase reactor was 230 ppm.

TABLE 7

Data of polymerization and resulting polymers

| | Example | |
|---|---|---|
| | R7 | C7 |
| Bulk Al/Ti | 250 | 250 |
| Bulk Al/Don | 10 | 10 |
| Bulk Propylene feed kg | 1.4 | 1.4 |
| Bulk $H_2$ mmol | 1000 | 1000 |
| Bulk T | 80 | 80 |
| Liquid C3 removed | 65% | — |
| Gas additional Al/Ti | 125 | — |
| Gas H2 mmol | 350 | 350 |
| Gas T | 85 | 85 |
| Split | 65/35 | 60/40 |
| $MFR_2$, g/10 min | 50 | 50 |
| Light components after gas phase, ppm | 150 | 230 |

Split: Production Split, Slurry/Gas Phase

Reference Example 8

Ethylene was polymerized in a 450 $dm^3$ slurry loop reactor in the presence of a catalyst system comprising a solid component which was a supported high activity Ziegler-Natta catalyst having as essential components Ti, Cl and Mg and which is sold by Engelhard under a trade name of Lynx 200 and triethylaluminum cocatalyst. The molar ratio of aluminum in the cocatalyst to titanium in the solid component was 120. The reactor was operated in propane slurry at a temperature of 95° C. and a pressure of 58 bar g. In addition, hydrogen was introduced so that its concentration in the ethylene feed was 450 mol/kmol. The ethylene concentration in the loop reactor was 4 mol %. The ethylene and propane feeds were 40 kg/h and 70 kg/hr, respectively. The catalyst feed rate was such that the polymerization (production) rate was 38 kg/h. The polymer had a melt flow rate $MFR_2$ measured at 190° C. of 400 g/10 min.

The polymer slurry was withdrawn intermittently from the reactor. The polymer slurry was passed into a first concentrating step, where a screen was used to separate a part of the fluid phase from the slurry. The polymer content of the entering slurry was 45% by weight and of the dense phase up to 65% by weight. The lean phase contained <0.1% of polymer. The polymer was mixed with a liquid flow of 6 kg propane/kg polymer and passed to a second concentration step operating in the same way as the first concentration step. The diluent recovered from the concentration steps was flared.

The content of light compounds fraction C8-C12 was determined from the polymer. it was found that it was 60 ppm (parts per million).

Comparative Example 8

The procedure of Reference Example 8 was repeated with the exception that the two concentration steps were not present in the process. The content of the light compounds fraction C8-C12 determined from the polymer was 160 ppm.

TABLE 8

Data of polymerization and resulting polymers

| | Example | |
|---|---|---|
| | R8 | C8 |
| Al/Ti | 120 | 120 |
| Propane feed, kg/h | 70 | 70 |
| $H_2$-/$C_2$-ratio, mol/kmol | 460 | 460 |
| $C_2$-feed, kg/h | 40 | 40 |
| Production (polymerization) rate, kg/h | 38 | 38 |
| $MFR_2$, g/10 min | 400 | 400 |
| $C_2$-content in the reaction mixture, mol % | 4.2 | 4.2 |
| Kg Propane/kg polymer | 6 | — |
| Light components C8-C12 after loop, ppm | 60 | 160 |

Example 1

Ethylene was polymerized in a loop reactor, operated at 95° C. temperature and 60 bar pressure so that into the reactor were fed 10.9 tons per hour of ethylene, 15 tons per hour of propane diluent, polymerization catalyst and hydrogen. The polymer production rate was 10 tons per hour. In addition, about 2 kg per hour of low molecular weight oligomers were formed. The slurry flow out of the reactor contained thus 898 kg/h of ethylene, 10000 kg/h of polymer, 15000 kg/h of propane and 2 kg/h of oligomers. This slurry stream was directed to a hydrocyclone. The result is shown in Table 9.

The bottom flow withdrawn from the hydrocyclone was directed to polymer recovery. The top flow withdrawn from the hydrocyclone was directed to purification steps to remove the oligomers from the diluent. These purification steps consisted of two distillation columns, one heavier column to remove components heavier than $C_4$ hydrocarbons, and a lighter column to remove light components such as hydrogen.

It can be seen that the oligomer content of the polymer has been reduced from 200 ppm to 72 ppm by installing one hydrocyclone after the slurry reactor. Meanwhile, a total stream of 10515 kg/h is directed to diluent purification steps.

TABLE 9

Slurry polymerization with one hydrocyclone.

| Kg/h | Loop in | Loop out | First hydrocyclone in | out top | 35.9% out bottom |
|---|---|---|---|---|---|
| c2 | 10900 | 898 | 898 | 898 | 0 |
| c3 | 15000 | 15000 | 15000 | 9615 | 5385 |
| LMW | 0.00 | 2.00 | 2.00 | 1.28 | 0.72 |
| Polymer | | 10000 | 10000 | 0 | 10000 |
| Total | 25900 | 25900 | 25900 | 10515 | 15385 |
| Polymer wt % | | 40% | 39% | | 65% |
| LMW wt % | | 0.02% | | | 0.007% |
| LMW in C3 | | 0.01% | 0.01% | 0.01% | 0.01% |
| LMW in PO ppm | | 200 | | | 72 |

Example 2

The procedure of Example 1 was repeated, except that the slurry withdrawn from the bottom of the hydrocyclone was mixed with 14250 kg/h of fresh propane and directed to a second hydrocyclone. The stream collected from the top of the first hydrocyclone was directed to diluent purification, whereas the stream withdrawn from the top of the second hydrocyclone was directly returned to the slurry polymerization reactor. The hydrocyclones were operated as shown in Table 10.

It can be seen that while the total diluent stream that was directed to the diluent purification was the same as in Example 1, i.e., 10515 kg/h, the amount of oligomers present in the final polymer product was reduced from 72 ppm to 27 ppm.

TABLE 10

Slurry polymerization with two hydrocyclones

| Kg/h | Loop in | Loop out | First device in | out top | 48.5% out bottom | Second device in | out top | 13.3% out bottom |
|---|---|---|---|---|---|---|---|---|
| c2 | 10900 | 898 | 898 | 898 | 0 | 0 | 0 | 0 |
| c3 | 15000 | 15000 | 15000 | 9615 | 5385 | 19635 | 14250 | 5385 |
| LMW | 0.70 | 2.70 | 2.70 | 1.73 | 0.97 | 0.97 | 0.70 | 0.27 |
| Polymer | | 10000 | 10000 | 0 | 10000 | 10000 | 0 | 10000 |
| Total | 25901 | 25901 | 25901 | 10515 | 15386 | 29636 | 14251 | 15385 |
| Polymer wt % | | 40% | 39% | | 65% | 33.7% | | 65% |
| LMW wt % | | 0.02% | | | 0.010% | | | 0.003% |
| LMW in C3 | | 0.02% | 0.02% | 0.02% | 0.02% | 0.00% | | 0.00% |
| LMW in PO ppm | | 200 | | | 97 | | | 27 |

Advantageously, the polyolefin product obtained with the process of the present invention contains a lower amount of impurities, such as odor-producing compounds and oligomers having a relatively low molecular weight. The impurities are effectively removed from the polymer in the concentration zone and removed from the process by purifying the second stream. The partial separation prevents the accumulation in the reaction mixture which occurs if the polymer-lean fraction is completely recycled without purification.

The resulting polymer furthermore has a reduced content of catalyst residues, and especially such catalyst residues that are soluble in the reaction mixture, such as aluminum alkyls. Moreover, due to the partial purification of the polymer-lean fraction, a substantial part of the undesired impurities is removed from the process without the need to pass the total fraction to purification steps. Thus, the purification zone can be dimensioned for a smaller stream, which is economically more advantageous and cost effective.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing polyolefins, comprising the steps of:

polymerizing at least one olefin monomer to obtain a reaction mixture;

separating at least a part of the reaction mixture to obtain a separated portion;

dividing the separated portion of the reaction mixture into a polymer-lean fraction and a polymer-rich fraction, wherein the division is carried out in the liquid or super critical state;

subjecting at least a part of the polymer-lean fraction to a purification step to obtain a purified polymer-lean fraction;

recycling at least a part of the purified polymer-lean fraction back into the polymerizing step of the at least one olefin monomer; wherein the polymerizing step comprises slurry polymerization;

the polymer-lean fraction is in liquid form or in a super critical state during all of the process steps; and the subjecting of the at least a part of the polymer-lean fraction to a purification step and the recycling of the at least a part of the purified polymer-lean fraction comprise:

dividing the polymer-lean fraction into a first and a second stream;

recycling the first stream to the polymerizing step of the at least one olefin monomer;

purifying the second stream; and recycling at least a part of the purified second stream back to the polymerizing step of the at least one olefin monomer.

2. The process according to claim 1, wherein the subjecting of the at least a part of the polymer-lean fraction to a purification step comprises removing impurities contained in the polymer-lean fraction; and the reaction mixture comprises at least 50% by mole of hydrocarbons having from 1 to 4 carbon atoms.

3. The process according to claim 1, wherein the purification step is carried out by conducting at least one distillation step.

4. The process according to claim 1, wherein the step of dividing the separated portion of the reaction mixture is carried out in a hydrocyclone or a screen.

5. The process according to claim 1, wherein the step of dividing the polymer-lean fraction is carried out in a hydrocyclone or a screen.

6. The process according to claim 1, wherein the polymer-lean fraction comprises at least one selected from the group consisting of: olefin oligomers, metal components, unreacted monomer, and byproducts formed during the polymerizing step.

7. The process according to claim 6, wherein the byproducts comprise at least one selected from the group consisting of ketones, aldehydes, sulphur-containing compounds, and alcohols.

8. The process according to claim 1, further comprising:
mixing the polymer-rich fraction with fresh olefin monomer to obtain a second mixture; and
dividing the second mixture into a second polymer-rich fraction and a monomer-rich fraction.

9. The process according to claim 8, further comprising recycling the monomer-rich fraction to the polymerizing step of the at least one olefin monomer.

10. The process according to claim 1, wherein the dividing of the polymer-lean fraction comprises dividing 10 to 95 wt % of the polymer-lean fraction into the second stream.

11. The process according to claim 1, wherein the separating at least a part of the reaction mixture is carried out continuously.

12. The process according to claim 1, wherein the separating at least a part of the reaction mixture is carried out intermittently.

13. The process according to claim 1, wherein the separating at least a part of the reaction mixture comprises concentrating a polymer in the reaction mixture to obtain another mixture and separating at least a part of the another, mixture to obtain the separated portion.

14. The process according to claim 13, wherein the concentrating is carried out by a settling leg.

15. The process according to claim 1, wherein a concentration of a polymer in the reaction mixture is from 30 to 60% by weight.

16. The process according to claim 1, wherein the polymerizing step is carried out in a stirred tank reactor or loop reactor.

* * * * *